United States Patent [19]

Sweeton

[11] Patent Number: 4,527,270
[45] Date of Patent: Jul. 2, 1985

[54] COMMUNICATIONS NETWORK WITH STATIONS THAT DETECT AND AUTOMATICALLY BYPASS FAULTS

[75] Inventor: David C. Sweeton, Cleveland Heights, Ohio

[73] Assignee: Allen-Bradley Company, Milwaukee, Wis.

[21] Appl. No.: 491,550

[22] Filed: May 4, 1983

[51] Int. Cl.³ .................. G06F 11/20; H04Q 9/00
[52] U.S. Cl. .................................. 371/11; 371/7; 370/16; 370/88
[58] Field of Search ......................... 371/7-9, 371/11; 370/16, 86, 88

[56] References Cited

U.S. PATENT DOCUMENTS

| 3,652,798 | 3/1972 | McNeilly et al. | 371/11 X |
| 3,876,983 | 4/1975 | Zafiropulo et al. | 371/11 X |
| 4,009,469 | 2/1977 | Boudreau et al. | 371/8 |
| 4,076,961 | 2/1978 | Holsinger et al. | 371/8 X |
| 4,205,326 | 5/1980 | Porter et al. | 370/86 X |
| 4,319,338 | 3/1982 | Grudowski et al. | 364/900 |
| 4,335,426 | 6/1982 | Maxwell et al. | 370/86 X |
| 4,354,267 | 10/1982 | Mori et al. | 371/11 |
| 4,380,061 | 4/1983 | Mori et al. | 370/16 |
| 4,435,705 | 3/1984 | Stevens | 370/86 X |

OTHER PUBLICATIONS

Andrews et al., *IBM Technical Disclosure Bulletin,* "Recovery From Transmission Medium Failures In A Ring", vol. 26, No. 2, Jul. 1983, pp. 803-804.

*Primary Examiner*—Jerry Smith
*Assistant Examiner*—Gary V. Harkcom
*Attorney, Agent, or Firm*—Barry E. Sammons

[57] ABSTRACT

A communication network suitable for industrial environments includes a set of stations which are linked together by a primary ring which conveys data in one direction around the ring and a secondary ring which conveys data in the other direction. The integrity of both the primary and secondary rings is continuously monitored by each station, and if a problem is detected, the stations automatically switch their mode of operation to bypass the detected problem.

6 Claims, 11 Drawing Figures

COMMUNICATIONS NETWORK WITH STATIONS THAT DETECT AND AUTOMATICALLY BYPASS FAULTS

BACKGROUND OF THE INVENTION

The field of the invention is industrial control systems such as process controllers, numerical controls and programmable controllers, and particularly, communication systems for connecting such controllers together in a network.

Historically, industrial control communications networks have been organized into star, multidrop, or ring configurations. In a star configuration, one controller, or "node", forms the center and acts as the network "master". Separate lines extend from this master node to all of the other "slave" nodes. In a multidrop network such as that disclosed in U.S. Pat. No. 4,319,338, a communication line, or data trunk, connects to a plurality of nodes by drop lines. In multidrop networks a single node may act as the network master, mastership may be transferred between nodes by passing a "token", or mastership may be transferred between nodes after a polling process determines which node requires control of the network. Also, in some multidrop networks contention schemes are employed to avoid the need for identifying a master node. In such systems each node "contends" for access to the data trunk, and when access is obtained, a message may be sent directly to any other node in the network. Special hardware is required to detect "collision" of messages on the data trunk.

With a ring configuration each node is linked to two other nodes in a loop arrangement. Messages are relayed around the loop from one node to the next. Messages are removed from the ring by the destination node, or if the message travels full circle, it is removed by the originating node. Because all communications is lost if any single node fails in a ring network, it is common practice to provide a second, or redundant, ring which is switched into operation if the primary ring fails. In a typical installation the primary ring and secondary ring are located adjacent to each other, and if an accident occurs which damages the data link for one ring, it is likely that the other data link will be damaged as well. When both rings are damaged, the entire communication system is closed down.

SUMMARY OF THE INVENTION

The present invention relates to an industrial communication network comprised of a plurality of nodes connected in a primary ring and a secondary ring configuration by twin data links. Each node includes a monitor which is in continuous communication with the monitor in the predecessor node and with the monitor in the successor node, and which is operable to detect a failure in such communications. Each node also includes a redundancy control which is operable in response to signals from the monitor to place the node in one of four states: (1) receive data from the predecessor node on the primary ring and transmit data to the successor node on the primary ring; (2) receive data from the predecessor node on the primary ring, transmit data to the successor node on the primary ring, receive data from the successor node on the secondary ring and transmit this same data to the predecessor node on the secondary ring; (3) receive data from the predecessor node on the primary ring and transmit data to the predecessor node on the secondary ring; and (4) receive data from the successor node on the secondary ring and transmit data to the successor node on the primary ring.

When the network is fully operable all nodes are in mode one and data is transmitted around the primary ring in one direction. If proper communications is lost between any two nodes, this is detected by their monitors and data is diverted onto the secondary ring and flows in the opposite direction. The node to one side of the "break" enters mode three, the node to the other side of the break enters mode four and the remaining nodes enter mode two. Communications between all nodes in the network may thus be maintained despite a break in both rings.

A general object of the invention is to provide a reliable communications network suitable for industrial environments. The monitor in each node continuously communicates through both the primary and secondary rings with adjacent nodes. When a fault is detected the monitor signals the redundancy control and the node is switched to another mode of operation to effectively bypass the detected fault.

Another object of the invention is to minimize the installation cost of the communications network. Because the system can effectively bypass a break in both rings, it is not necessary to physically separate the cables which link the nodes in the ring. Both cables can be installed at the same time thus reducing the installation time and cost over prior redundant ring networks.

Yet another object of the invention is to promptly detect a fault condition in the network and reroute message data around the fault with minimal loss of data and minimal delay. This is achieved by the monitor circuits in each node which are in continuous communication with the monitor circuits in adjacent nodes. A fault may thus be detected even when message data is not being conveyed, and the nodes are then switched to an appropriate mode without delay. No polling messages for locating the fault nor messages commanding mode changes after a fault is located are required.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

GENERAL DESCRIPTION OF THE INVENTION

Figure 1:
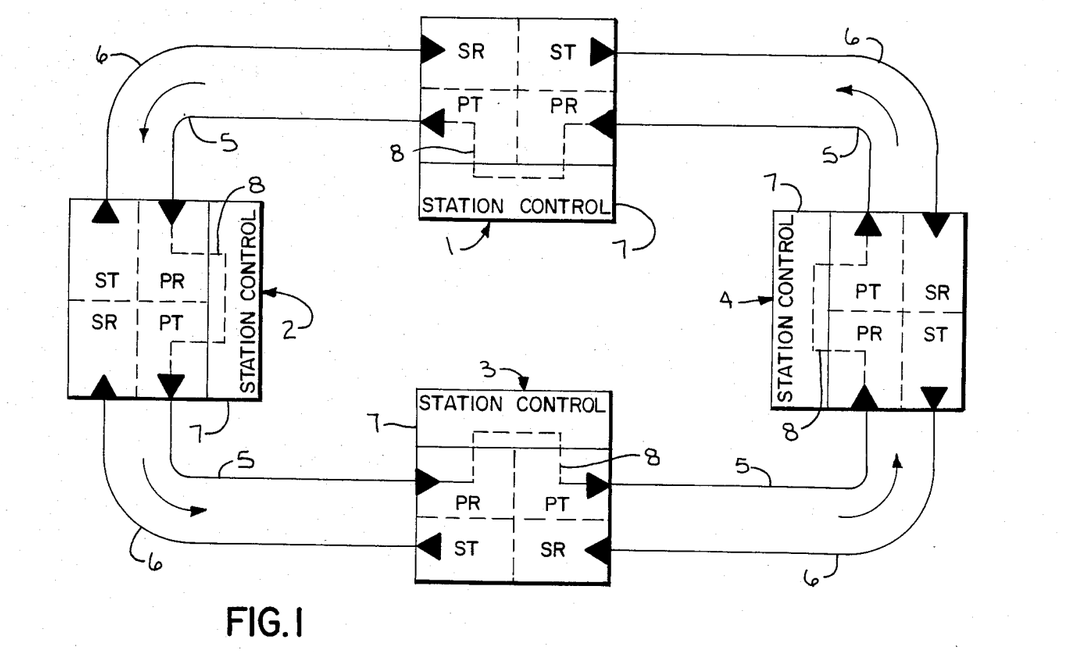
FIGS. 1-4 are schematic diagrams of an industrial control network which employs the present invention and which show the network in a variety of states.

Referring particularly to FIG. 1, a four node communications network includes a set of four stations 1-4 which are connected together in a double ring configuration by a primary data link 5 and a secondary data link 6. Each station 1-4 includes a primary receiver (PR) for receiving data on the primary data link 5 from a predecessor station, and a primary transmitter (PT) for transmitting data to the successor station. Each station 1-4 also includes a station controller 7 which removes data from the network and inserts data addressed to other stations on the network as indicated by the dashed line 8. The stations 1-4 also include secondary receivers (SR) and secondary transmitters (ST) which connect to the secondary data link 6. Whereas the primary receivers and transmitters PR and PT convey data around the primary ring 5 in the counterclockwise direction, the secondary transmitters and receivers SR and ST connect to convey data in the clockwise direction around the secondary ring 6.

Referring still to FIG. 1, when the communications network is fully operational all stations, or nodes, are in mode one. In mode one data is input to each station 1-4 from the predecessor node on the primary ring 5 and transmitted to the successor node on the primary ring 5. No message data is conveyed on the secondary ring 6, although the secondary ring 6 is active to continuously monitor the condition of the network as will be explained in more detail below. Each station 1-4 may originate messages which are conveyed on the primary ring 5 to a designated destination station, and each station 1-4 may remove messages from the ring 5 which are directed to it. In addition, each station 1-4 performs a "repeat" function in which it passes messages from the predecessor node on the primary ring 5 to the successor node.

Figure 2:
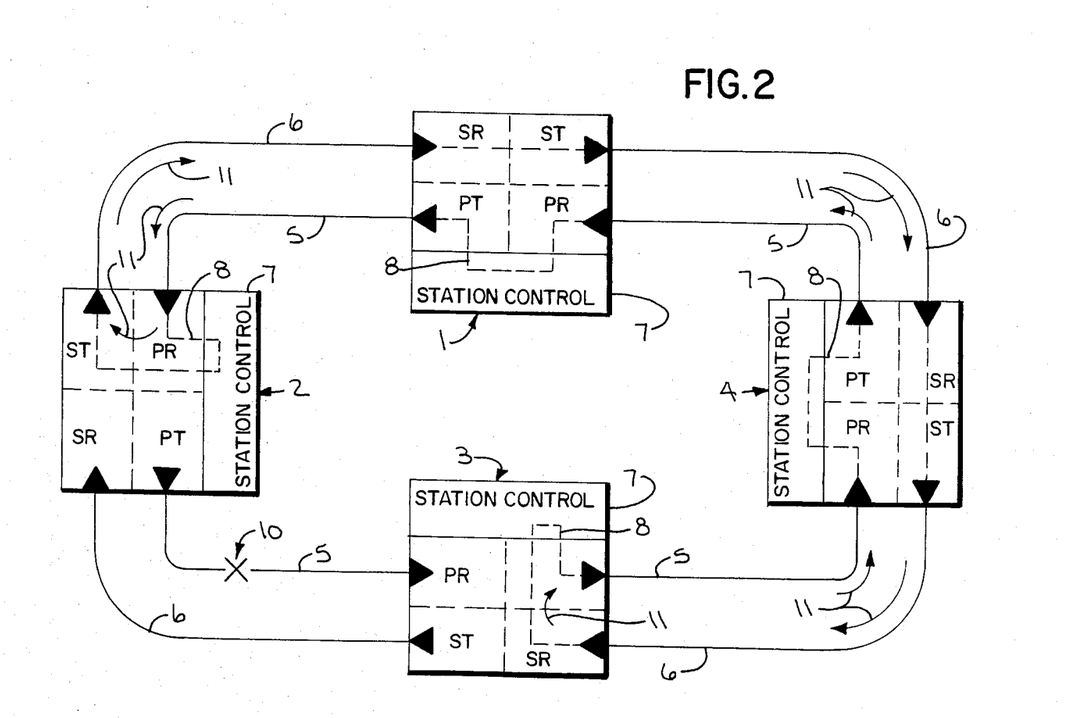

Referring particularly to FIG. 2, if a break, or fault, should occur in the primary ring 5, as indicated by the "X" 10, each of the stations 1-4 switches to a different mode. The station 2 which precedes the break 10, switches to mode three in which data is received on the primary ring 5 and transmitted on the secondary ring 6 in the reverse direction. On the other hand, station 3 which succeeds the break 10 switches to mode four in which it receives data on the secondary ring 6 and transmits data on the primary ring 5. The remaining stations 1 and 4 switch to mode two in which their primary receiver and transmitter PR and TR operate in their normal fashion, but their secondary receiver and transmitter SR and ST operate to pass through message data on the secondary ring 6. As indicated by the arrows 11, despite the break 10 in the primary ring 5, message data continues to reach all stations 1-4 in the network after these mode changes are made. It should be apparent that even if the secondary ring 6 is broken at the same time between stations 2 and 3, communications is maintained between all stations in the network.

Figure 3:
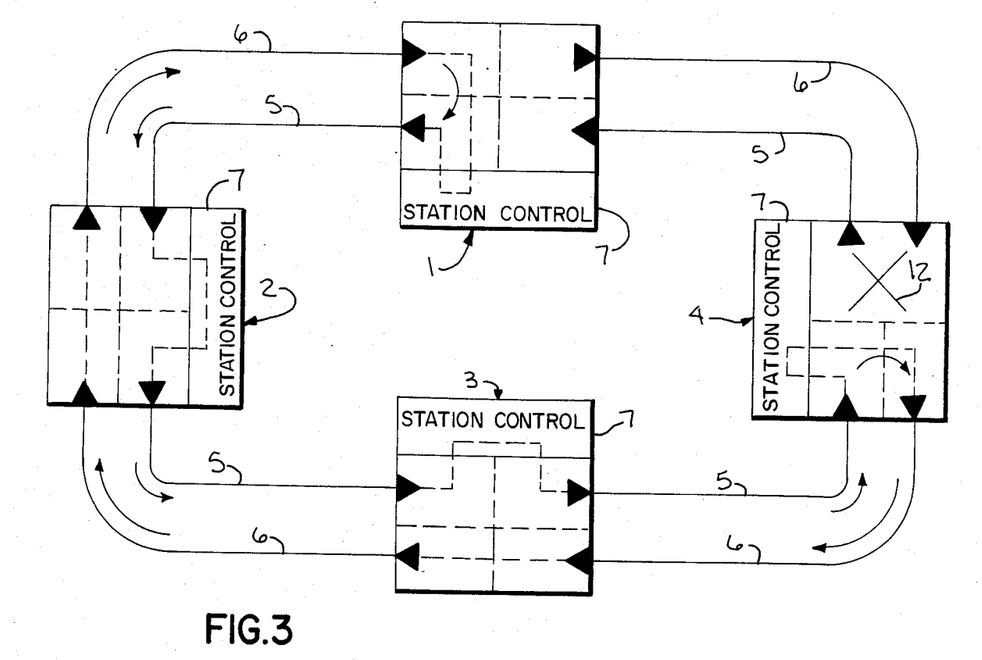

Referring particularly to FIG. 3, if a malfunction should occur in the transmitter/receiver of one station in the network, communications may still be maintained. As indicated by the "X" 12, such a malfunction in station 4 for example, would prevent communications between stations 1 and 4 on both the primary and secondary rings 5 and 6. Station 1 switches to mode four and station 4 switches to mode three to divert messages from the malfunction. Stations 2 and 3 switch to mode two to perform a repeat function on the secondary ring 6.

Figure 4:
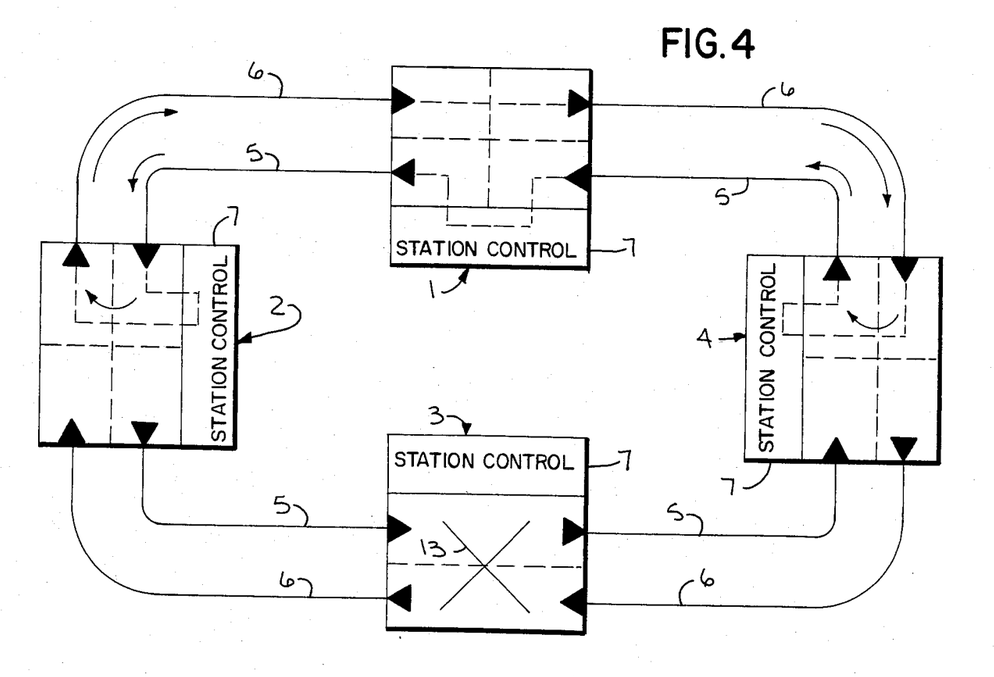

Referring particularly to FIG. 4, if a malfunction should occur which renders a station inoperable, that station is isolated and communications is maintained on the remainder of the network. As indicated by the "X" 13, if station 3 should become inoperable, station 2 switches to mode three and station 4 switches to mode four to divert message data away from station 3. Station 1 switches to mode two to complete the loop which enables stations 1, 2 and 4 to continue communicating with each other.

As will now be described in more detail, the station controller 7 in each station 1-4 is responsible for monitoring the condition of the network and for switching the station to the appropriate mode. In the preferred embodiment of the invention, wire cables are employed as the links between stations in both the primary ring 5 and secondary ring 6. However, other media such as fiber optics may also be employed.

DESCRIPTION OF THE PREFERRED EMBODIMENT

Figure 5:
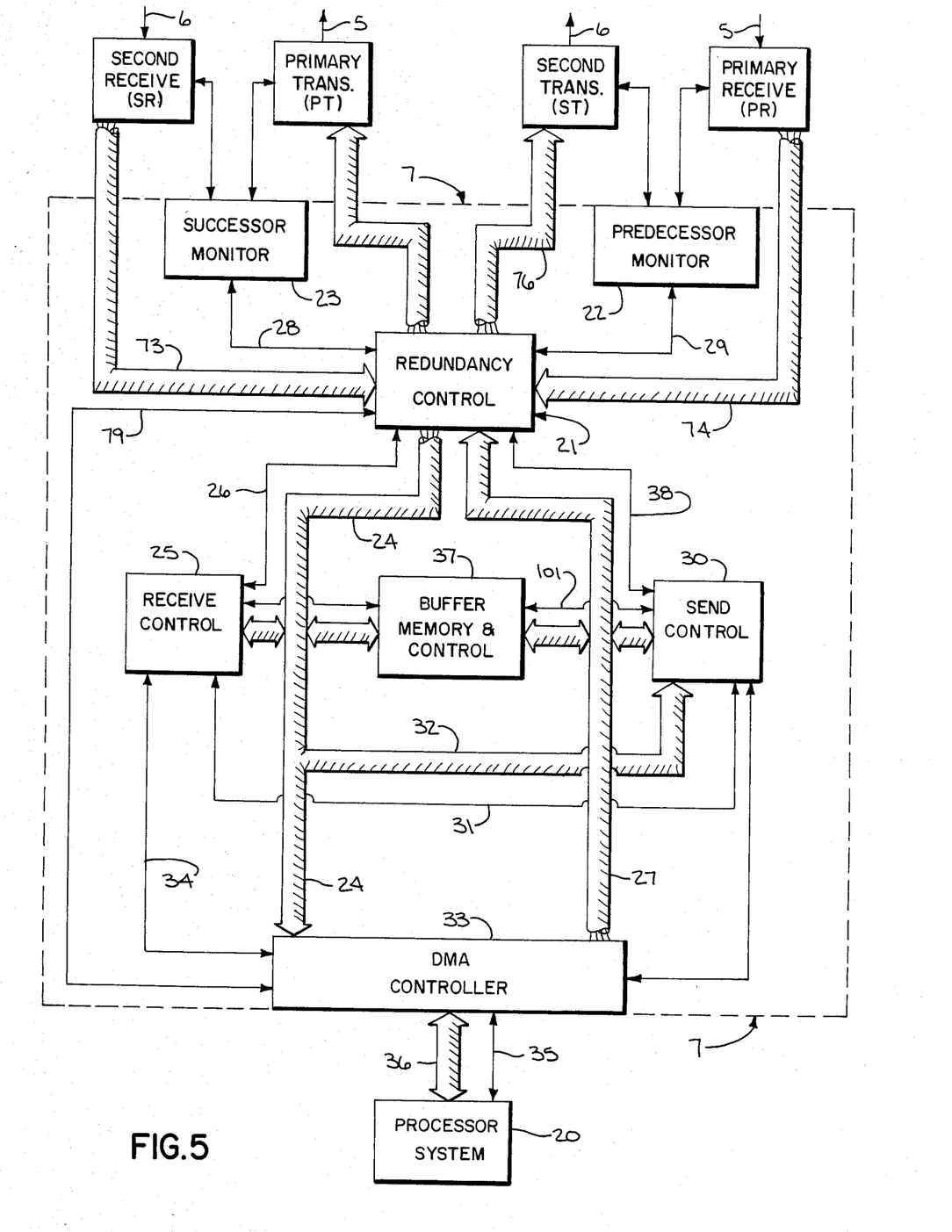
FIG. 5 is an electrical block diagram of a station which forms part of the network of FIGS. 1-4.

Referring particularly to FIG. 5, each station control circuit 7 interfaces the communications media (data links 5 and 6) to a processor system 20. Such processors 20 typically include interface modules on programmable controllers, numerical controls, process controls and general purpose digital computers. Although the station control circuit 7 may be constructed with discrete logic devices, a custom large scale integrated circuit, or a programmed microprocessor system, in the preferred embodiment many of the functions are carried out with field programmable logic sequencers such as the 82S105 manufactured by Signetics, Inc. and with programmable logic arrays such as those sold under the trademark "PAL Series 20" by Monolithic Memories.

Referring still to FIG. 5, the primary receiver (PR) and the secondary transmitter (ST) are connected to a redundancy control circuit 21 in the station control 7. A byte of data may be output by the redundancy control circuit 21 to the secondary transmitter 6, and a byte of data may be input to the redundancy control circuit 21 from the primary receiver (PR). This data flows to and from the predecessor station in the network and it is controlled by a predecessor monitor circuit 22. As will be explained in more detail below, the monitor circuit 22 continuously examines each data byte received from the predecessor station and notifies the redundancy control 21 when valid data is available. The monitor circuit 22 also informs the redundancy control 21 when a fault is detected.

The predecessor monitor circuit 22 signals the redundancy control 21 when a data byte can be sent through the secondary transmitter (ST). If no data is to be transmitted, it is an important feature of the present invention that the predecessor monitor 22 will direct the secondary transmitter (ST) to continuously send "delimiter characters" to the predecessor station on the network. Similarly, such delimiter characters are continuously received at the primary receiver (PR) from the predecessor station between packets of message data. As a result, the monitor circuit 22 is in "continuous" two-way communications with the predecessor station even though message data may be sent or received only sporadically.

If the predecessor monitor circuit 22 detects a fault in communications from the predecessor station, it responds immediately. Such a fault may be sensed in three ways. First, data (either message data or delimiter data) received through the primary receiver (PR) may be interrupted for a preset time interval. Second, the data may be received, but transmission errors at the bit level may be detected; and third, "abort" characters may be received from the predecessor station. In any case, the monitor circuit 22 notifies the redundancy control circuit 21 and directs the secondary transmitter (TR) to send abort characters to the predecessor station rather than delimiter characters.

A successor monitor circuit 23 connects to the secondary receiver (SR), primary transmitter (PT) and the redundancy control 21. It performs the same functions as the monitor 22, but with the connections to the successor station in the network.

The redundancy control 21 is responsible for establishing the mode of operation and channeling message data accordingly. When operating in mode one, the redundancy control 21 receives message data from the primary receiver (PR) and routes it to a receive data bus 24 after alerting a receive control circuit 25 through a control line 26. The redundancy control 21 also receives message data bytes from a transmit bus 27 and routes them to the primary transmitter (PT). No message data is conveyed on the secondary link 6, although the monitor circuits 22 and 23 do continue to send and receive delimiter bytes on the link 6.

If the successor monitor 23 signals through line 28 that a fault has occurred in one or both of the links with the successor station, the redundancy control 21 switches to mode three. In mode three data bytes are still received through primary receiver (PR) and passed to the receiver bus 24, but now the data bytes received from the transmit bus 27 are routed to the secondary transmitter (ST). Communications with the successor station is monitored but no message data is received from or transmitted to the successor mode.

If the predecessor monitor 22 signals through control line 29 that a fault has occurred in the links with the predecessor station, the redundancy control 21 switches to mode four. In mode four message data is received from the secondary receiver (SR) and routed to the receiver bus 24. Message data from the transmit bus 27 is conveyed to the primary transmitter (PT) and no message data is transmitted to or received from the predecessor station.

If while the station is operating normally in mode one a message byte is received by the secondary receiver (SR), the successor monitor 23 signals the redundancy control 21 to switch to mode two. In mode two, message data is received from the primary receiver (PR) and transmitted through the primary transmitter (PT) in the same manner as mode one. However, message data is also received at the secondary receiver (SR) and coupled directly to the secondary transmitter (ST).

Referring still to FIG. 5, the receiver control circuit 25 receives a signal from the redundancy control 21 which indicates that a byte of data is available. The receive control 25 analyzes the message data to determine if the message is to be relayed on to the next station in the network, is to be removed from the network, or is to be conveyed to the processor system 20. Each message includes a source address byte which indicates the source of the message, and the receive control 25 compares this byte with its own station number. If a match is found, the message is removed from the network and a "send control circuit" 30 is notified through control line 31 that one of its messages has returned. Each such message contains a sequence count byte (MAC control byte) which is extracted by the receive control 25 and coupled to the send control circuit 30 through a bus 32. As will be explained below, this MAC control byte is employed to determine the number of messages this station has on the network at any time. It is employed to limit the number of messages placed on the network by any one station.

Each received message also includes a destination address byte and when this corresponds to the station's own address, the receive control circuit 25 notifies a DMA controller 33 through a control line 34. The DMA controller 33 receives each byte in such messages from the receive bus 24 and transmits them to a buffer memory in the processor system 20 through a data bus 36. When the receive control circuit 25 indicates that all bytes have been correctly received, the DMA controller 33 is signalled and it notifies the processor 20 through a control line 35 that the message is accurate.

All received messages which did not originate at the station are relayed to the next station in the network. The receive control 25 in such cases directs the message data to a buffer memory and control circuit 37. The buffer memory and control circuit 37 stores messages in the order which they are received, and in response to commands from the send control circuit 30, these messages are output in the same order to the transmit bus 27.

The redundancy control 21 signals the send control 30 through line 38 when a byte of data can be accepted for transmission to the next station in the network. The send control 30 examines the buffer memory 37 for message data, and if data is available, it is read onto the transmit bus 27 and written to the redundancy control 21. If data is not available in the buffer memory 37, the send control 30 will accept message data from the DMA controller 33. As will be explained in more detail below, before placing such a new message on the network the send control 30 first determines that this station has not exceeded the allowed number of messages on the network. It then creates a new message with data read from the processor system 20 by the DMA controller 33 and applies it one byte at a time to the input of the redundancy control 21.

Figure 6:
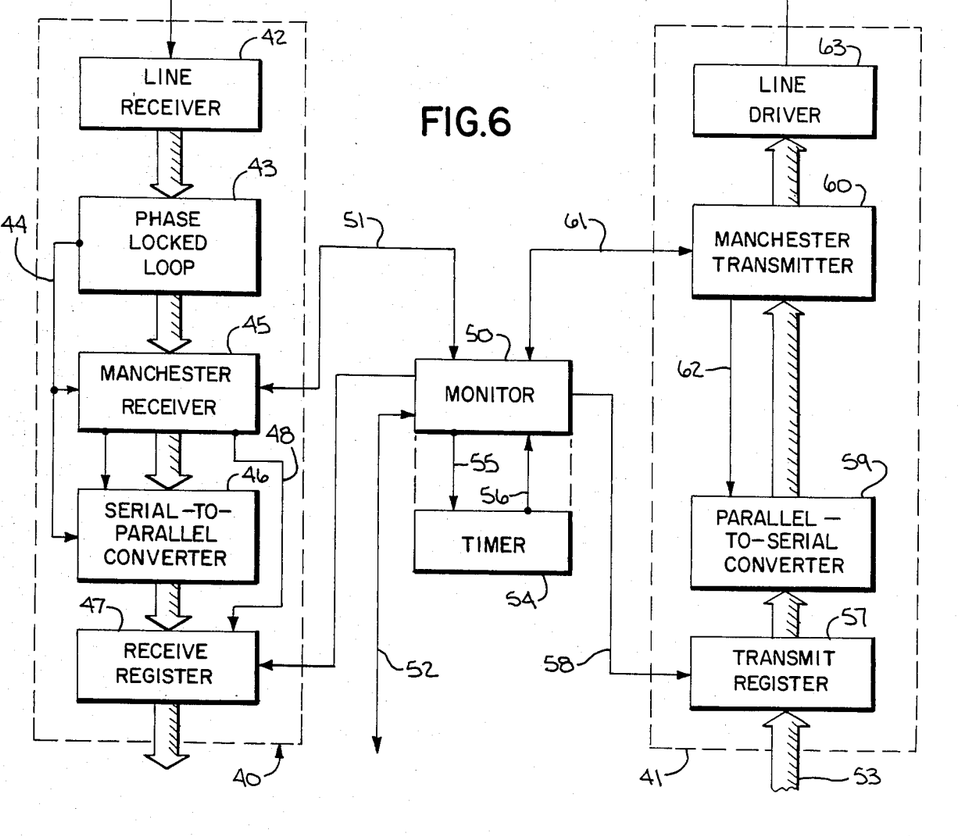
FIG. 6 is an electrical schematic diagram of a monitor and associated receiver and transmitter which form part of the station of FIG. 5.

Referring particularly to FIG. 6, the primary and secondary receivers PR and SR are identically constructed. One such receiver is indicated by dashed line 40 and its matching transmitter is indicated by dashed line 41. The receiver 40 includes a line receiver 42 which converts the data link voltages to TTL/MOS compatible voltage levels. If the data links are fiber optic cables, then the line receiver 42 converts the light signal to TTL/MOS compatible voltage levels.

The signal produced by the line receiver 42 is applied to the input of a phase locked loop 43. This circuit contains a counter which is clocked at eight times the baud rate of the network and which generates a clock signal on line 44 which is synchronized with the digital input signal. This synchronized clock signal is used by a manchester receiver 45 and a serial-to-parallel converter 46 to process each byte of input data. The manchester receiver 45 is a programmable logic sequencer which decodes the manchester encoded signal from the line receiver 42 and sends each bit to the serial-to-parallel converter 46. The manchester receiver 45 recognizes the boundries between bytes and it signals a receive register 47 through a line 48 when a byte is available at the converter 46. The manchester receiver 45 also signals the monitor 50 when a byte is available at the receive register 47, and it signals the monitor 50 through control line 51 when erroneous signals, or certain control bytes are sensed.

Figure 7:
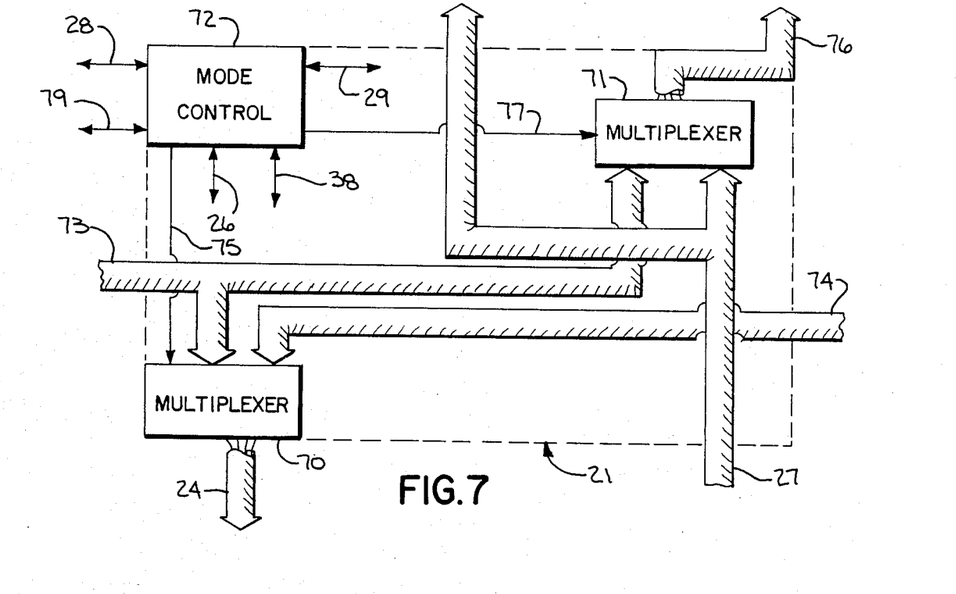
FIG. 7 is an electrical schematic diagram of a redundancy control circuit which forms part of the station of FIG. 5.

The monitor 50 is a programmable logic sequencer which receives signals from the receiver 40 that indicate its current state. In response to these signals it sends control signals through a line 52 to the redundancy control circuit 21 (FIGS. 5 and 7). The control line 52 corresponds to control lines 28 or 29 in FIG. 5. The monitor 50 also receives signals from the redundancy control circuit 21 through control line 52 when a byte of data is available on bus 53 for transmission.

A timer 54 connects to the monitor 50 and is reset thereby through a control line 55 each time a message data byte or a delimiter byte is received at the manchester receiver 45. If a fault should occur which disrupts the receipt of such data, the timer 54 "times out" and generates an error signal to the monitor 50 through control line 56. As indicated above, such an error indication causes the redundancy control 21 to change the mode of station operation to by-pass the fault.

Referring still to FIG. 6, when the redundancy control 21 signals the monitor 50 that a data byte is available on bus 53, the monitor 50 clocks a transmit register 57 through a control line 58. The data byte is latched in the register 57 and is applied to the inputs of a parallel-to-serial converter 59. The monitor 50 then sends a transmit request signal to a manchester transmitter 60 through control line 61. The manchester transmitter is a programmable logic sequencer which signals the parallel-to-serial converter through a control line 62 when it is ready to accept another byte of data. As the converter 59 shifts out the byte, the manchester transmitter codes the bits and sends them to a line driver 63. The line driver 63 converts the logic level input signals to the cable voltages and currents, or to a light signal if fiber optic cable is used. When message data bytes are not available for transmission, the monitor 50 directs the manchester transmitter 60 to generate delimiter characters. Thus, a continuous stream of serial data is produced by the transmitter 41 to maintain continuous communication with the receiving station on the network. If for any reason this continuous stream of data is not generated or is not received, then the monitor in the receiving station "times out" and a fault is indicated.

The operation of the monitor 50 is identical in each station. The monitor operates according to the following protocol:
 (a) When there is no information to transmit and the quality of the data at its receiver is satisfactory, the manchester transmitter 60 is directed to send delimiter characters.
 (b) When the redundancy control 21 signals that a byte is to be transmitted and the receiver signal quality is satisfactory, the byte is transmitted.
 (c) When the quality of the received data is inadequate, the redundancy control 21 is signalled that the communication link is bad and the manchester transmitter 60 is directed to send abort characters.
 (d) When received data quality is restored for a specified time period, the redundancy control 21 is signalled that the communication link is restored.
 (e) Received data is passed to the redundancy control when the communication link is good.
 (f) If a string of three abort characters is received, the communication link is declared bad by signalling the redundancy control 21.
 (g) When two successive delimiter characters are received the communication link is declared good.
 (h) The monitor 50 can be directed through control line 52 by the redundancy control 21 to declare the communication link bad.
 (i) The monitor 50 increments the first byte in each message (the pass count) received at its receiver 40. If the pass count exceeds a pre-established limit, none of the message bytes are passed on to the redundancy control 21. This function insures that messages are eventually removed from the network.

Referring particularly to FIGS. 5 and 7, the redundancy control 21 is comprised of an input multiplexer 70, an output multiplexer 71, and a mode control circuit 72. The input multiplexer 70 drives the receive bus 24 and it has one input connected to an 8-bit input bus 73 which connects to the secondary receiver (SR). The other multiplexer input connects to an 8-bit input bus 74 which is driven by the primary receiver (PR). The multiplexer 70 is controlled by the mode control 72 through a control line 75 to couple the receiver bus 24 to either the input bus 73 or the input bus 74.

The output multiplexer 71 drives an 8-bit output bus 76 which connects to the secondary transmitter (ST). One input to the multiplexer 71 is driven by the transmit bus 27 and its other input is driven by the 8-bit input bus 73. Data on either the transmit bus 27 or the input bus 73 may thus be coupled to the secondary transmitter (ST) by controlling the state of a control line 77.

Referring particularly to FIGS. 5 and 7, the mode control 72 is a programmable logic sequencer which is responsive to input signals on control lines 26, 28, 29 and 38 to determine the mode of operation. The mode is then implemented by controlling the multiplexer select lines 75 and 77. For example, if the successor monitor 23 indicates through control line 28 that communications with the successor station on the network has been disrupted, the mode control 72 switches the station to mode three. This is accomplished by directing the multiplexer 70 to receive input data from bus 74 and directing the multiplexer 71 to output data on the bus 76 from the transmit bus 27. The mode control 72 continues to monitor signals from the successor monitor 23, but signals indicating the receipt of data or the successful transmission of data is limited to control line 29 which connects to predecessor monitor 22. A control line 79 also connects the mode control 72 to the DMA controller 33, and through this line the processor system 20 can determine the station mode. Also, the processor system 20 can write a mode command to the DMA controller 33 which directs the mode control 72 to change the station mode. This capability is used, for example, during power-up when it is assumed that communications is fully operable and that the station should be operating in mode one.

Figure 8:
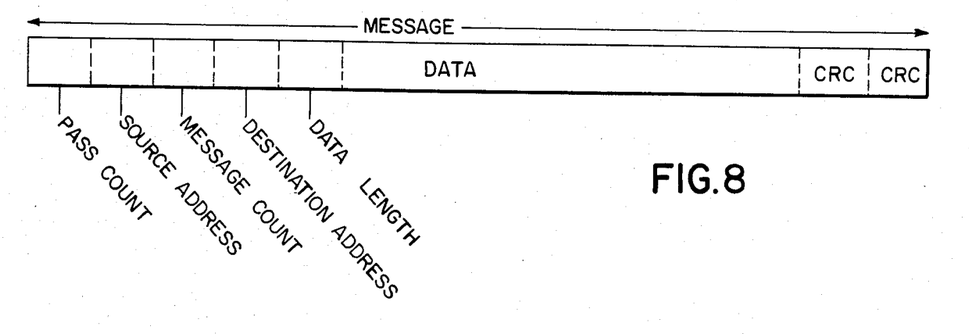
FIG. 8 is a schematic representation of a message which is conveyed on the industrial control network of FIGS. 1-4.
Figure 9:
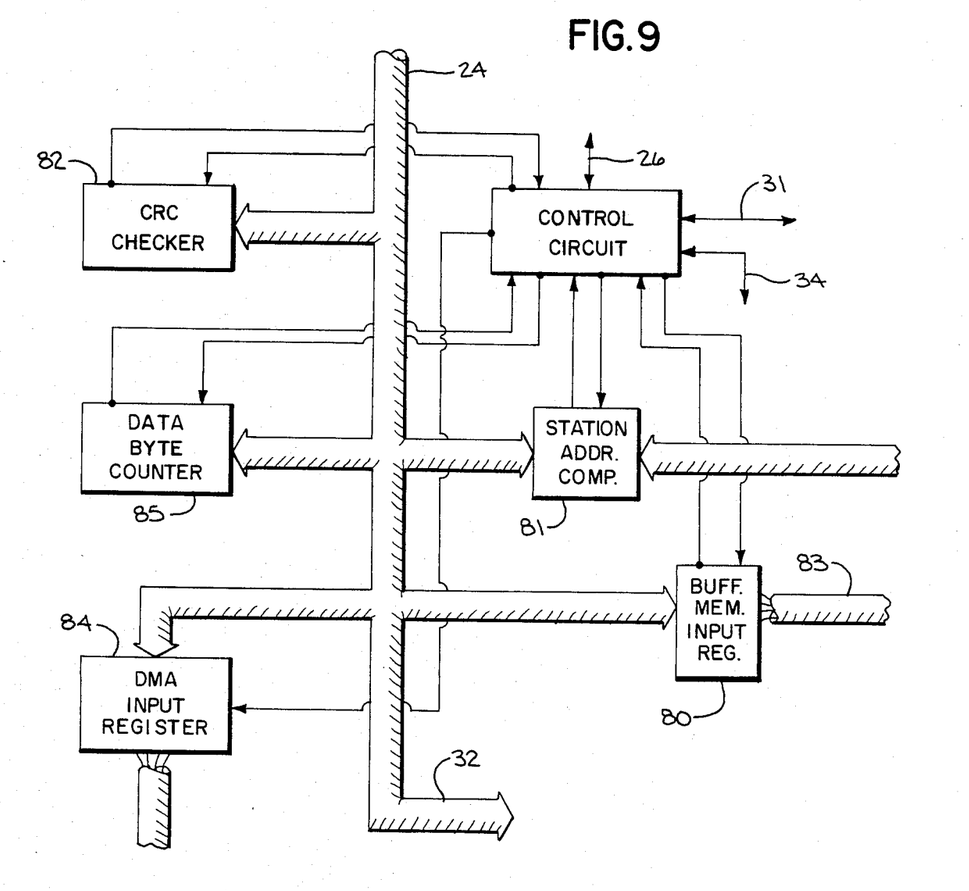
FIG. 9 is an electrical schematic diagram of the receive control circuit which forms part of the station of FIG. 5.

Referring particularly to FIGS. 5, 8 and 9, each message which is received by the station and passed to the receive bus 24 by the redundancy control 21 is comprised of a number of bytes of data. The receive control circuit 25 is signaled through control line 26 when the message data is available, and the first byte of the message (the pass count) is latched in a buffer memory input register 80. The next byte of the message is the source address of the message and it is applied to one input of a station address comparator 81 where it is compared with a station address. The station address is received from the DMA controller 33 through a bus 82, and when identity is found, the message data is to be removed from the network. Otherwise, the message data is passed on to the next station in the network through the memory buffer and control 37.

If the local address agrees with the source address byte in the message, the message is to be removed, but since the CRC must be checked, a CRC checker 82 will be enabled to tally all further bytes received in this message. When the next byte (message count) is received, a signal is sent by the receive control circuit to the send control 30 indicating that the message count is on the bus 32. The send control 30 employs the message count byte to keep track of the number of messages this station has placed on the network. When the entire message has been received, the CRC checker 82 is directed to check the last two bytes to determine if the message has been accurately received. If so, the message is removed from the network and the receive control 25 awaits receipt of the next message packet from the redundancy control 21.

If the source address does not compare with the station number, the message is passed on to the buffer memory and control 37. In such case, each received byte is latched in the buffer memory input register 80 and is then clocked onto a bus 83 which connects to the buffer memory 37. In addition, the fourth byte of each message is a destination address which is applied to the station address comparator 81. If identity is found, the data bytes in the message are also clocked into a DMA input register 84 so that they may be sent to the processor 20.

The fifth byte in each message indicates the number of data bytes in the message. This data length byte is clocked into a data byte counter 85 which is then decremented as each subsequent data byte is processed. When the counter 85 reaches zero, the data has been processed and the next two bytes are applied to the CRC checker 82 to determine if an accurate transmission has occurred. The DMA controller 33 is then signaled through control line 34 that the message data is accurate and the DMA controller 33 may in turn signal the processor 20.

Figure 10:
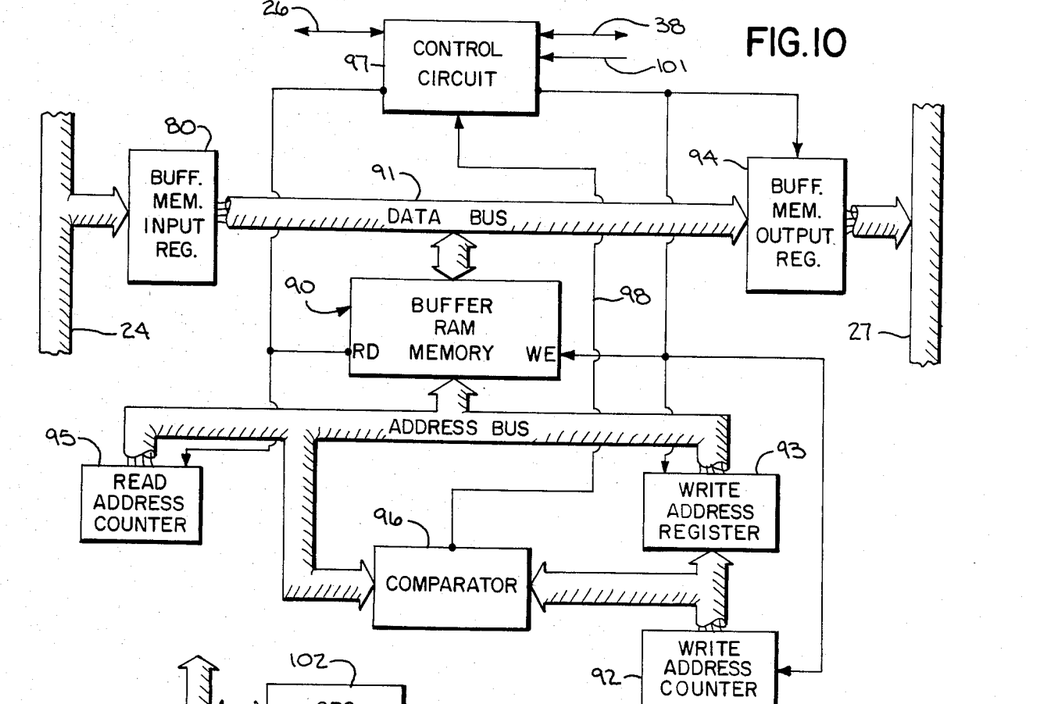
FIG. 10 is an electrical schematic diagram of the buffer memory and control circuit which forms a part of the station of FIG. 5.

Referring particularly to FIGS. 5 and 10, the buffer memory and control 37 receives message data from the receive bus 24 which is to be retransmitted to the next station in the network. Each byte of the message is input through the buffer memory input register 80 and is written into a buffer RAM memory 90 through a data bus 91. The message bytes are stored at successive memory addresses and successive messages are stored in the memory 90 in the order in which they are received. A write address counter 92 is incremented each time a byte is stored in the memory 90, and the address which it generates is coupled to the address terminals of the memory 90 through a write address register 93.

Messages stored in the buffer memory 90 are read out one byte at a time and coupled through the data bus 91 to a buffer memory output register 94. A read address counter 95 is incremented each time a byte is read from the memory 90, and as a result, the message data stored in the memory 90 is read out in the same order as it was stored. A comparator 96 receives both the read and write address data and when a match is detected, a control circuit 97 is signaled through line 98 that the buffer memory 90 is empty. The control circuit 97 is a programmable logic sequencer which generates the control signals to the various elements associated with the buffer memory 90. It signals the receive control 25 through line 26 when it is ready to receive data at register 80, and it signals the send control 30 through line 38 when a data byte is available for transmission at the output register 94.

Figure 11:
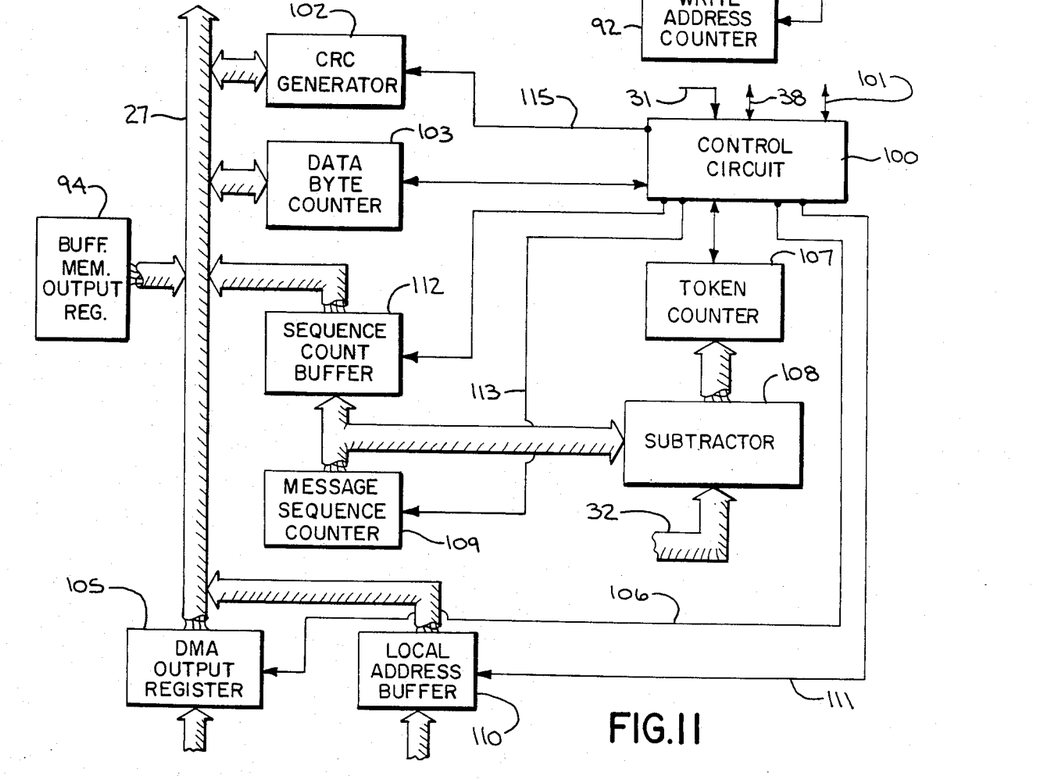
FIG. 11 is an electrical schematic diagram of the send control circuit which forms part of the station of FIG. 5.

Referring particularly to FIGS. 5 and 11, the send control 30 conveys messages to the redundancy control 21 which may originate from either the buffer memory and control 37 or the DMA controller 33. As in the buffer memory 37, these are conveyed to the redundancy control 21 for transmission on the network. When the buffer memory 37 is emptied, then messages originating from the processor system 20 may be placed on the network. When a message is to be sent which originates in the buffer memory 37, a control circuit 100 in the send control circuit 30 signals the buffer control to output a byte to the buffer memory output register 94. This message data is applied to the redundancy control 31 through the transmit bus 27. The control circuit 100 signals the redundancy control 21 through control line 38 as each message byte becomes available. As each message byte is applied to the redundancy control 21, a CRC generator 102 is signaled to input the byte. In addition, when the data length byte appears at the output register 94, it is loaded into a data byte counter 103. The data byte counter 103 is decremented as each data byte is subsequently conveyed to the redundancy control 21, and when it reaches zero, the control circuit 100 is alerted. The CRC generator 102 then sequentially places its two CRC bytes on the transmit bus 27 for application to the redundancy control 21.

The message data may in the alternative originate from the station's processor 20 if two conditions are met. Such message data is output through a DMA output register 105, and CRC generator 102 operates in the same manner. The DMA output register 105 receives message data from the DMA controller 33 and it is enabled by the control circuit 100 through line 106.

Message data which originates at the station's processor 20 may be inserted into the stream of data flowing through the station if the buffer memory 37 is empty and the station does not already have an excessive number of messages on the network. The first condition is sensed by the comparator 96 in the buffer memory and control circuit 37 (FIG. 10). The control circuit 97 signals this condition to the control circuit 100 in the send control 30 (FIG. 11) through line 38. The second condition is established by a token counter 107 which keeps track of the number of messages this station has placed on the network. The token counter is incremented by the control circuit 100 each time an original message is sent and it is preset to a count determined by a subtractor 108 each time one of the station's messages is returned to the receive control 25. As indicated above, the message count byte in each such received message is applied through the bus 32 to one set of inputs on the subtractor 108. A message sequence counter 109 connects to the other set of subtractor inputs, and this counter 109 indicates the value of the message count byte in the last station message inserted on the network. The difference between this latest message count and the message count value in the most recently returned station message indicates the number of station messages currently on the network. If this number exceeds a preset value, the control circuit 100 is inhibited from inserting further station messages until station messages currently on the network are returned.

When a station message is inserted on the network, the CRC generator 102 is preset to zero and outputs this value as the "pass count" byte to the transmit bus 27. The control circuit 100 signals the redundancy control 21 through line 38 that a byte is available for transmission. After the pass count byte is transmitted, a local address buffer 110 is enabled through control line 111 and the station's own address is conveyed to the redundancy control 21 for transmission. The CRC generator 102 is also enabled to tally this source address byte and all subsequent bytes in the message.

The next byte in the station's message is the message count. This byte is applied to the transmit bus 27 by a sequence count buffer 112 which connects to the output of the message sequence counter 109. The counter 109 is then incremented one count by enabling control line 113. The destination address byte is then read from the DMA output register 105, followed by the data length byte. Both of these bytes are conveyed to the redundancy control 21 and the data length byte is clocked into the data byte counter 103. The data bytes which follow are coupled from the DMA output register 105 to the redundancy control 21 and the data byte counter 103 is decremented. When the counter 103 reaches zero, the CRC generator 102 is signaled through control line 115 to place the two CRC bytes on the bus 27 for transmission.

It should be apparent from the above description that many variations are possible from the preferred structure. For example, many of the functions which are carried out by discrete hardware components in the preferred embodiment may be carried out by a programmed microprocessor. On the other hand, these same hardware components may also be constructed as a custom large scale integrated circuit where the economics justify the initial design costs. The present invention is independent of the particular technology which is chosen.

The invention claimed is:

1. In a communication network having a plurality of station nodes connected together in a ring configuration by a primary data link which conveys data around the ring from station to station in one direction and a secondary data link which conveys data around the ring from station to station in the other direction, an improved station which comprises:
    a primary receiver connected to the primary data link to receive data from a predecessor station on the network;
    a primary transmitter connected to the primary data link to transmit data to a successor station on the network;
    a secondary transmitter connected to the secondary data link to transmit data to the predecessor station on the network;
    a secondary receiver connected to the secondary data link to receive data from the successor station on the network;
    a predecessor monitor connected to the primary receiver and the secondary transmitter, said predecessor monitor being operable:
        (a) to detect poor data quality at the primary receiver;
        (b) to detect the receipt of abort data by the primary receiver; and
        (c) to generate a first error signal when either of the conditions in (a) or (b) is detected; and
    a successor monitor connected to the primary transmitter and the secondary receiver, said successor monitor being operable:
        (d) to detect poor data quality at the secondary receiver;
        (e) to detect the receipt of abort data by the secondary receiver; and
        (f) to generate a second error signal when either of the conditions in (d) or (e) is detected; and
    a redundancy control circuit connected to the predecessor monitor and the successor monitor, the redundancy control circuit being responsive to the generation of the first or second error signals to control the mode of operation of the station and to thereby direct the conveyance of message data between the station and the predecessor and successor stations;
    when the station is in mode one message data is received by the primary receiver and transmitted by the primary transmitter, the secondary receiver receives data from the successor station, and the secondary transmitter transmits delimiter data to the predecessor station;
    where the station is switched to mode four when the first error signal is generated and all message data is received at the secondary receiver and transmitted by the primary transmitter; and
    where the station is switched to mode three when the second error signal is generated and all message data is received at the primary receiver and transmitted by the secondary transmitter.

2. The improved station as recited in claim 1 in which the redundancy control circuit is responsive to message data received by the secondary received when the station is in mode one to switch the station to mode two in which message data received at the primary receiver continues to be transmitted by the primary transmitter and all message data received at the secondary receiver is transmitted directly by the secondary transmitter.

3. The improved station as recited in claim 1 in which the redundancy control circuit includes:
    a first multiplexer having one input coupled to the primary receiver, a second input coupled to the secondary receiver, and an output coupled to a receive bus;
    a second multiplexer having one input coupled to the secondary receiver, a second input coupled to a transmit bus, and an output coupled to the secondary transmitter.

4. The improved station as recited in claim 1 in which each monitor is operable to direct its associated transmitter to send abort data when the monitor detects poor data quality at its associated receiver.

5. The improved station as recited in claim 4 in which each monitor is operable to direct its associated transmitter to send delimiter data when the monitor does not detect poor data quality at its associated receiver and there is no message data available for transmission by its associated transmitter.

6. The improved station as recited in claim 1 in which each monitor is responsive to the value of a pass count byte contained in message data received at its associated receiver to remove the message data associated with the pass count byte from the communications network when the arithmetic value of the pass count byte exceeds a preset amount.

* * * * *